Jan. 29, 1924.

A. T. STURT 1,482,100

FLOOR AND FENDER SUPPORT FOR MOTOR TRUCKS

Filed March 13, 1920 2 Sheets-Sheet 1

Inventor
Alfred T. Sturt
By Attorneys
Blackmore, Spencer & Flint

Jan. 29, 1924. 1,482,100
A. T. STURT
FLOOR AND FENDER SUPPORT FOR MOTOR TRUCKS
Filed March 13, 1920 2 Sheets-Sheet 2

Inventor
Alfred T. Sturt
By Blackmore, Spencer & Flint
Attorneys

Patented Jan. 29, 1924.

1,482,100

UNITED STATES PATENT OFFICE.

ALFRED T. STURT, OF NEW YORK, N. Y., ASSIGNOR TO GENERAL MOTORS CORPORATION, OF DETROIT, MICHIGAN, A CORPORATION OF DELAWARE.

FLOOR AND FENDER SUPPORT FOR MOTOR TRUCKS.

Application filed March 13, 1920. Serial No. 365,591.

*To all whom it may concern:*

Be it known that I, ALFRED T. STURT, a citizen of the United States, and a resident of New York, county of New York, and State of New York, have invented certain new and useful Improvements in Floor and Fender Supports for Motor Trucks, of which the following is a full, clear, concise, and exact description, such as will enable others skilled in the art to which the invention relates to make and use the same, reference being made therein to the accompanying drawings, which form a part of this specification.

My invention relates to motor driven vehicles, and particularly to motor driven trucks of the general class or type wherein the power plant and the seat or seats of the vehicle are located as far forward, relative to the frame of the vehicle, as practicable; so as to leave as great a portion as possible of the frame free for the reception and support of various racks, boxes, and similar load carrying devices designed to be used interchangeably with a single vehicle.

The principal object of my invention is to provide certain improvements in and relating to motor driven vehicles or trucks of the general class above referred to, that is of the type wherein as great a portion of the frame of the vehicle is left free and unobstructed as practicable; said invention having to do, particularly, with the floor structure beneath and in front of the seat or seats of the vehicle, and with the fenders associated with the forward wheels thereof.

A further object of my invention is to provide certain new and useful improvements in and relating to the method of supporting a floor in front of the seat of the vehicle, and to one side of and extending along the hood thereof; two floors located one upon each side of the engine hood and supported in part from the protecting frame of the radiator used with and forming a part of the power plant of the vehicle, and in part by the supporting frame for the seat structure, being commonly provided in the vehicle.

A further object of my invention is to provide an improved floor structure having the feature above referred to, in combination with a fender for the forward wheel of the vehicle; the said fender being supported for the most part from and by the floor structure, or from the elements which support the floor structure from the vehicle.

With the above and other objects of invention in view, my invention consists in the improved combined floor supporting structure and fender illustrated in the accompanying drawings and hereinafter described and claimed; and in such variations and modifications thereof, within the scope of the concluding claims, as will be obvious to those skilled in the art to which my invention relates.

Referring now to the drawings wherein the preferred embodiment of my invention is illustrated:

Figure 1:
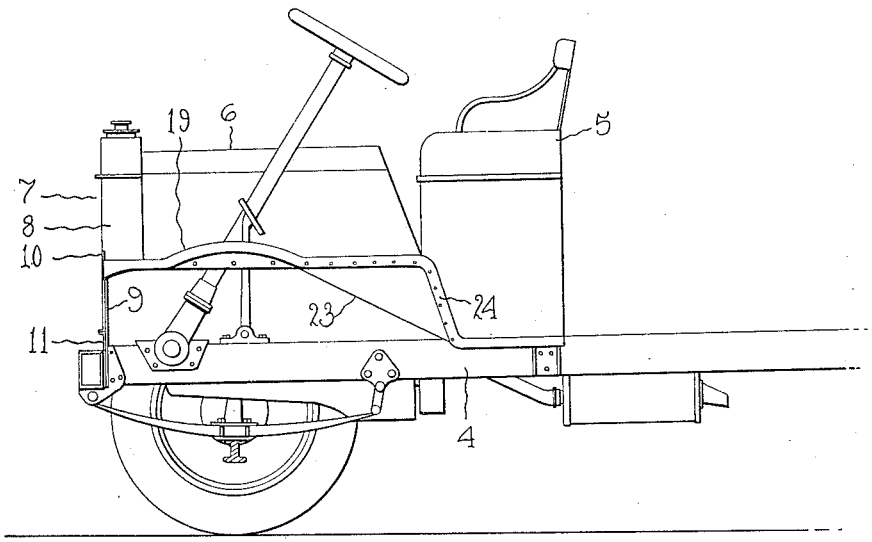
Figure 1 is a view showing the forward portion of a motor driven truck in side elevation and equipped with my invention, the view showing so much only of the motor vehicle as is necessary to illustrate my invention and the manner in which the same is applied to the vehicle.

Referring now to the drawings, the reference numeral 4 designates the left-hand one of the two longitudinally extending frame members which together form the frame of the vehicle, said members being located one upon each side of the vehicle and supported from the axles thereof through suitable springs; the frame formed by said two frame members serving to support the power plant, the seats, and other portions of the vehicle, as well also as to provide a platform to the rear of the power plant and seat structure upon which a rack, box, or other load carrying member may be placed and supported.

The reference numeral 5 designates the seat structure of the vehicle, 6 the hood thereof, and 7 the radiator whereby the cooling liquid for the internal combustion engine which propels the vehicle is cooled; these elements being all located as far forward upon and relative to the frame of the vehicle as practicable, as indicated in Figure 1, in order to thereby provide as long a space or platform extending rearward from said elements as possible for the reception of interchangeable racks, boxes, or equivalent load carrying structures. The engine whereby the vehicle is operated is located beneath the hood 6 as will be appreciated; and power is communicated to the rear driving wheels not shown of the vehicle through any suitable transmission mechanism, as is usual in motor driven vehicles.

The radiator 7 comprises a central core structure designed to accomplish the cooling of the cooling water as is usual in radiators, which core structure is commonly surrounded and protected by a suitable frame or casing the side members of which are designated by the reference numerals 8; and which side frame members are commonly of comparatively heavy construction to thereby protect the comparatively delicate cellular structure of the radiator core. The radiator as a whole of which the protecting frame work above mentioned is regarded as forming a part is supported from the frame of the vehicle in any suitable way and said radiator is located adjacent the front end of the frame of the vehicle, all as is usual in motor vehicle construction.

Figure 2:
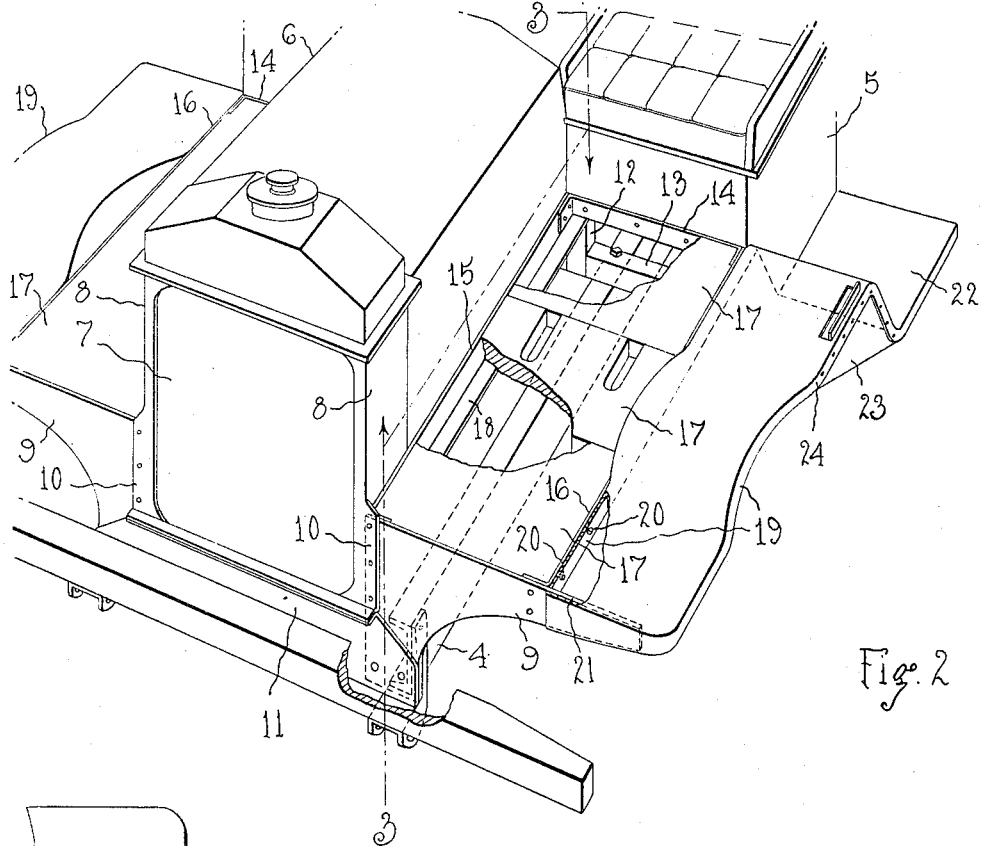
Figure 2 is a fragmentary view in perspective showing the forward end of a motor vehicle equipped with my invention.

Extending laterally from the radiator and located above the level of the frame of the vehicle are two arms 9; the inner ends of said arms being preferably secured to the side frame members 8 of the protecting frame of the radiator through flanges 10 upon said sides, in which case the arms in question are supported from and by the radiator structure as will be appreciated. The upper edges of these arms are substantially horizontal, as best shown in Figure 2, and portions thereof extend downwardly as shown and are connected with one another through a cross plate 11 in the embodiment of my invention illustrated, to thereby provide a strong supporting structure for the forward ends of the floors and the corresponding ends of the front wheel fenders which are supported by said arms.

Figure 3:
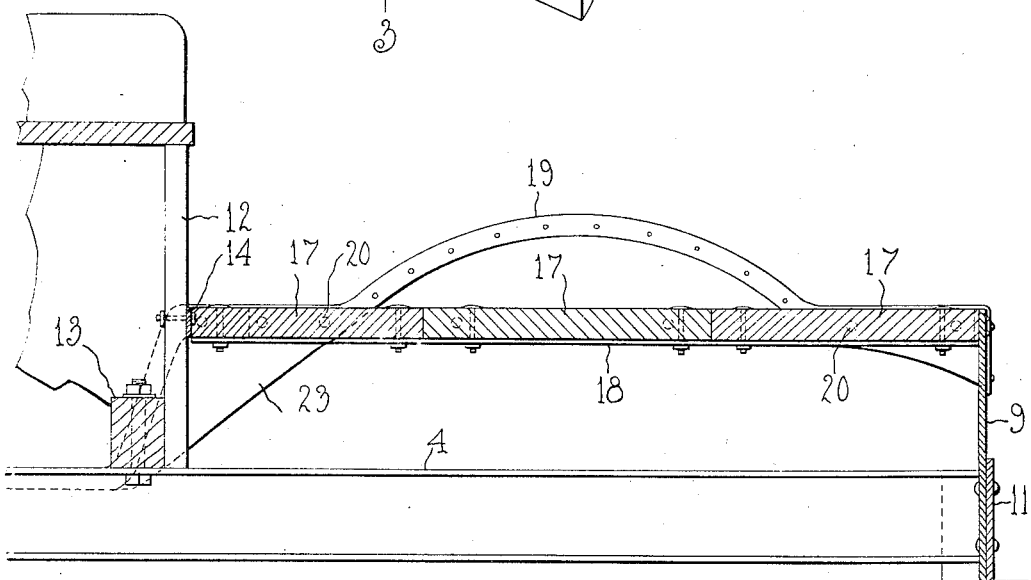
Figure 3 is a view showing a section upon a vertical plane extending longitudinally of the vehicle, and the location of which is indicated, approximately, by the line 3, 3, Figure 2.

The seat structure is supported above the frame of the vehicle by means of a plurality of seat supporting posts 12 the lower ends of which are commonly secured to cross bars 13 located one at the front and the other at the rear of the said structure, and which bars rest upon the side frame members, although one only of said cross bars is illustrated in Figure 3; and the cross bars and posts form a frame structure which supports the seat or seats of the vehicle, as will be understood. The seats are preferably in duplicate, one being located upon each side of the vehicle, as indicated in Figure 2; and the frame work whereby they are supported will be provided with as many upright seat posts 12 as may be necessary to provide a structure of proper strength to support the seats, the two separate seats being both supported from the cross bars 13 which in turn rest upon the frame of the vehicle and extend across the same just to the rear of and as close to the power plant thereof as practicable.

Secured to and supported in each case by one or more of the posts 12 of the seat supporting frame are two cross bars 14, one upon each side of the hood 6, and which cross bars are located above the frame of the vehicle in order that the floors supported from the arms 9 and the cross bars 14 may be substantially horizontal.

Extending between each supporting arm 9 and the corresponding cross bar 14 and located alongside the hood structure 6 are two floor supporting sills 15, 16 the forward ends of which are secured to the laterally extending arm 9 while the rear ends thereof are secured to the cross bar 14 directly to the rear of said arm, whereby supports for the rear ends of said sills are provided. These sills are preferably right angular in cross section, and the space between them is filled by a suitable number of floor boards 17 the ends of which are supported by the horizontally extending flanges 18 of the sills, as will be understood from Figure 2 of the drawings; from which it follows that the floor boards are supported at a level above the frame of the vehicle by the said floor sills the ends of which are supported, respectively, by the arm 9 and by the cross bar 14; which supporting members are themselves supported one from the radiator frame and the other from the frame structure which supports the seat. As hereinbefore stated, such a floor structure is preferably provided upon each side of the hood 6, although as a matter of course a floor may be provided upon one side only of the hood should a single floor be preferred for any reason.

Suitable fenders for the front wheels of the vehicle indicated by the reference numerals 19 are secured to the outer of the floor supporting sills 16 as by means of fastening screws 20 spaced along the joint between the outer surface of said floor sill and the adjacent surface of the fender. The forward ends of these fenders are also commonly given additional support by projecting portions 21 of the laterally extending arms 9, which portions extend under the fenders at their forward ends, as clearly shown in Figure 2. The rear ends 22 of the fenders which provide steps for enabling the operator of the vehicle to mount the same and reach the seats are also commonly given additional support by laterally extending brackets secured to the side frame members 4; although if desired the rear portions of the fenders may be supported entirely from the seat structure which, as will be appreciated, extends downward below the level of the floor boards 17 to the level of the frame. The rear portions of the fenders are also or may be strengthened by means of triangular webs 23 the upper and rear edges of which are secured to inturned flanges 24 of the fenders.

In view of the premises it will be appreciated that my invention provides an improved floor structure of simple construction, and one which may be provided at a minimum of expense as the vehicle is manufactured and assembled; and which floor structure serves as a support for the adjacent front wheel fender of the vehicle. The floor structure being located upon a level above the frame of the vehicle, and to one side of the hood thereof obviously provides a construction and arrangement of a motor vehicle wherein the power plant and seat structure are located as close to the forward end of the frame as practicable, thus leaving the greater portion of the frame free and unobstructed for the reception of whatever form of interchangeable body is to be used.

Having thus described and explained my invention, I claim and desire to secure by Letters Patent:

1. In a motor vehicle of the class described a suitable frame; a radiator located adjacent the forward end of said frame and supported therefrom, and which radiator includes two oppositely located protecting frame members; an arm disposed above the level of said frame and extending laterally from said radiator, and the inner end of which is secured to one of said protecting frame members so as to be supported thereby; a seat supporting post extending upwardly from said frame; a cross bar secured to said seat supporting post; two floor supporting sills right angular in cross section and spaced apart from one another and the rearward ends of which are secured to said cross bar; a fender extending alongside the outermost of said sills and secured thereto, and the forward end of which is supported by the laterally extending arm aforesaid and a series of floor boards extending between and the ends of which are supported by said sills.

2. In a motor vehicle of the class described a suitable frame; a radiator located adjacent the forward end of said frame and supported therefrom, and which radiator includes a protecting frame having vertically extending side members; an arm supported above the level of said frame and extending laterally from said radiator, and the inner end of which is secured to a vertically extending member of said protecting frame; a seat supporting post extending upwardly from said frame; a cross bar secured to said seat supporting post; two floor supporting sills spaced apart from one another and the forward ends of which are secured to the arm aforesaid, and the rear ends of which are secured to said cross bar; and a plurality of floor boards the ends of which are supported by said floor supporting sills.

3. In a motor vehicle of the class described, a suitable frame; a radiator located adjacent the forward end of said frame and supported therefrom; an arm disposed above the level of said frame and extending laterally from said radiator; a seat supporting post extending upwardly from said frame; a cross bar secured to said seat supporting post; two floor supporting sills spaced apart from one another and the forward ends of which are secured to the arm aforesaid and the rear ends of which are secured to said cross bar; and a fender extending along the outermost of said sills and the forward end of which is supported by the laterally extending arm aforesaid.

4. In a motor vehicle of the class described, a suitable frame; a radiator located adjacent the forward end of said frame and supported therefrom; an arm disposed above the level of said frame and extending laterally from said radiator; a seat supporting post extending upwardly from said frame; a cross bar secured to said seat supporting post; and two floor supporting sills spaced apart from one another and the forward ends of which are secured to the arm aforesaid and the rear ends of which are secured to said cross bar.

5. In a motor vehicle of the class described, a suitable frame; a laterally extending arm disposed above the level of said frame and located adjacent the forward end thereof; a seat supporting post extending upwardly from said frame; a cross bar secured to said seat supporting post; two floor supporting sills spaced apart from one another and the forward ends of which are secured to the arm aforesaid and the rear ends of which are secured to said cross bar; a floor supported by said sills; and a fender extending alongside the outermost of said floor supporting sills and the forward end of which is supported by the laterally extending arm aforesaid.

6. In a motor vehicle of the class described, a suitable frame; a radiator located adjacent the forward end of said frame and supported therefrom; an engine hood extending rearward from said radiator; a transversely extending seat supporting frame supported by the vehicle frame and located to the rear of said hood; a supporting member extending laterally from the radiator; and floor supporting means extending along the side of said hood and the forward end of which is supported by said supporting member, and the rear end of which is supported by said seat supporting frame.

7. In a motor vehicle of the class described, a suitable frame; a radiator located adjacent the forward end of said frame and supported therefrom; an engine hood extending rearward from said radiator; a seat supporting frame located to the rear of said hood; a supporting member located adjacent the forward end of the vehicle frame; a floor structure extending along the side of said hood and the forward end of which is supported by said supporting member, and the rear end of which is supported by said seat supporting frame; and a front wheel fender secured to said floor structure and extending along the same.

8. In a motor vehicle of the class described, a suitable frame; a radiator located adjacent the forward end of said frame and supported therefrom; an engine hood extending rearward from said radiator; a seat supporting structure located to the rear of said hood; a supporting member located adjacent the forward end of the vehicle frame and above the level thereof; a substantially horizontal floor structure located above the level of said frame and extending along the side of said hood and the forward end of which is supported by said supporting member, and the rear end of which floor structure is supported by said seat supporting structure; a front wheel fender secured to said floor structure and extending along the same, and which fender is bent downward at its rear end and so shaped as to provide a step at the rear extremity thereof; and a brace member two edges of which are secured, respectively, to the rear end of the upper horizontal portion of said fender and to the downwardly bent portion at the rear end thereof, to thereby strengthen said fender.

9. In a motor vehicle of the class described; a suitable frame; a radiator located adjacent the forward end of said frame and supported therefrom; an engine hood extending rearward from said radiator; a seat supporting frame located to the rear of said hood; a supporting member located adjacent the forward end of the vehicle frame; two substantially horizontal floor supporting sills spaced apart from one another and the forward ends of which are secured to the supporting member aforesaid, and the rear ends of which sills are supported by said seat supporting frame; a floor carried by said sills and extending along the side of said hood; a front wheel fender secured to and extending along the outer of said sills, and the rear end of which extends downwardly and serves as a support for a step; and a strengthening and bracing web two edges of which are secured, respectively, to the rear end of said fender and to the downwardly bent portion thereof.

10. In a motor vehicle of the class described, a suitable frame; a seat supported from and located adjacent the forward end of said frame; a hood extending forward from said seat and terminating at the front end of said frame; and floor supporting means located at a higher level than the top portions of the front wheels of the vehicle and extending alongside said hood and terminating adjacent the front ends of said hood and frame.

11. In a motor vehicle of the class described, a suitable frame; a seat supported from and located adjacent the forward end of said frame; a hood extending forward from said seat and terminating at the front end of said frame; floor supporting means located above the level of said frame and extending alongside said hood and terminating adjacent the front ends of said hood and frame; and a fender supported by said floor supporting means and extending alongside the same.

12. In a motor vehicle of the class described, a suitable frame, a seat supported by and located adjacent the forward end of said frame; a hood extending forward from said seat and terminating at the front end of said frame; and a floor and fender structure extending forward from said seat and alongside said hood and over a front wheel of the vehicle, and terminating adjacent the front end of said frame.

In testimony whereof I affix my signature.

ALFRED T. STURT.